United States Patent [19]
Graiver et al.

[11] Patent Number: 5,789,516
[45] Date of Patent: Aug. 4, 1998

[54] METHOD OF MAKING SILICONE-ORGANIC BLOCK COPOLYMERS

[75] Inventors: Daniel Graiver, Midland; Aaron Quoc Khieu, Coon Rapids; Binh Thanh Nguyen, Midland, all of Mich.

[73] Assignee: Dow Corning Corporation, Midland, Mich.

[21] Appl. No.: 826,716

[22] Filed: Apr. 7, 1997

[51] Int. Cl.$^6$ ................................................. C08G 77/06
[52] U.S. Cl. ............................ 528/19; 525/479; 526/279; 528/21
[58] Field of Search ...................... 528/19, 21; 525/479; 526/279

[56] References Cited

U.S. PATENT DOCUMENTS

| | | | |
|---|---|---|---|
| 4,609,574 | 9/1986 | Keryk | 427/407 |
| 5,405,913 | 4/1995 | Harwood | 525/245 |

*Primary Examiner*—Morton Foelak
*Attorney, Agent, or Firm*—James L. DeCesare

[57] ABSTRACT

A method of manufacturing block copolymers containing a polyorganosiloxane segment, by dual polymerization involving (i) polycondensation of a silicone block followed by (ii) the free radical polymerization of a monomer that can be polymerized by free radical polymerization, such as a vinyl containing organic monomer. Initiation of free radical polymerization in step (ii) is carried out with a carbonyl functional group attached to the silicone polymer block. The carbonyl functional silicone polymer, preferably an aldehyde functional silicone polymer, is included as one component of a copper-based Redox initiating system. The method ensures no free homopolymerization, complete reactivity, and various polymer architectures are possible, including for example, polymeric structures such as AB, ABA, (AB)$_n$, brush, and radiant types. The method is fast, effective, convenient, and easier to control than typical ionic polymerization techniques. The silicone-organic block copolymers obtained by the process have utility as polymeric surfactants or as solubility modifiers.

10 Claims, No Drawings

METHOD OF MAKING SILICONE-ORGANIC BLOCK COPOLYMERS

BACKGROUND OF THE INVENTION

This invention is directed to the initiation of free radical polymerization of vinyl containing organic monomers, and more particularly to the use of carbonyl functional silanes and carbonyl functional siloxanes as free radical initiators.

Block copolymers are composed of two or more segments of different linear macromolecules attached by primary covalent bonds. These polymers, and their related family of graft copolymers, are known and some of them are produced commercially on a grand scale. In many cases, one or more particularly desirable properties can be obtained and derived by virtue of the combination and close proximity of the individual polymeric segments, that without covalent bonds to hold them together, would separate into two phases. Some commercially available block copolymers find diverse utility, for example, as specialized surfactants, compatibilizing agents, elastoplasts, thermoplastic elastomers, antistatic agents, and impact resistance modifiers.

The properties of these block copolymers can be changed over a wide range, based on the relative composition of the individual blocks, their composition, their molecular weight, and their molecular weight distribution. For example, if a particular polymer is prepared by casting the block copolymer from a solvent, as in some coating applications, the nature of the solvent employed during casting also plays an important role.

For the most part, block copolymers are prepared by the sequential addition of vinyl monomers using ionic or living polymerization techniques, and such techniques have been extended to polysiloxane containing block copolymers which are useful as stabilizing surfactants in the production of flexible polyurethane foams.

In principle, therefore, these block copolymers are prepared by the polymerization of hexamethylcyclotrisiloxane ($D_3$) initiated with a lithium salt of a hydrocarbon such as n-butyl lithium ($CH_3CH_2CH_2CH_2Li$) in an inert solvent containing a promoter typically dimethyl sulfoxide (DMSO). The lithium salt is sufficiently active to cause the ring opening polymerization of $D_3$ without promoting siloxane bond rearrangements. This living segmented polysiloxane can then be reacted with a vinyl monomer yielding desired block copolymers.

Although this approach has been successful on a small scale in the preparation of numerous silicone-organic block copolymers, it has not been found to be altogether practical on a commercial scale. This is because of the high cost of the starting materials and the severe requirements of the process itself, including the fact that a high vacuum is required, moisture and other impurities must be excluded, and the procedure necessitates the use of large quantities of solvent.

Significant efforts have therefore been made to develop commercial methods for the synthesis of such block copolymers. While several different approaches have been attempted, they have been fraught with difficulty, and are deficient for reasons enumerated hereinafter.

A. Oligomeric Linking or Coupling

One way to prepare block copolymers is to couple oligomers having telechelic functional groups that only react with one another, an approach often termed the chain extension reaction. If only one terminal group is active per oligomeric segment, an AB type block copolymer can be obtained, while multiple active telechelic functional groups provide multi-functional, alternating, and block copolymers of $(AB)_n$ type. One example of this approach is the condensation reaction of an alpha, omega-diepoxide functional polydimethylsiloxane (PDMS) with a carboxy terminated polyester.

The drawbacks of this approach are that it is necessary to ensure that each siloxane chain is terminated with an active functional group, and it is necessary to ensure complete reactivity of all active terminal groups. The latter requirement is difficult to attain since minute imbalances in molar ratio of the reactive groups lead to incomplete coupling and low molecular weight polymerization. This problem is particularly acute when using polysiloxanes, because due to the polycondensation reaction by which polysiloxanes are prepared, they include a mixture of linear and cyclic polymer species. The cyclic species do not participate in the coupling reaction, and this makes it difficult to determine precisely the concentration of the other segment which is required to achieve a high molecular weight product. Furthermore, other than telechelic functional polysiloxanes such as $\equiv Si-OH$, $\equiv Si-H$, $-Si-(CH_3)_3$, $-Si-OR$, $\equiv Si-OAc$, $\equiv Si-Cl$, $\equiv Si-CH=CH_2$, and $\equiv Si-(CH_2)_4-CH=CH_2$, telechelic functional polysiloxanes are not readily available on a commercial scale, and the preparation of other types of telechelic functional polysiloxanes would only add a significant expense and more difficulty to this process.

B. Random Block Polymerization

According to this approach, an oligomer having telechelic functional groups is reacted with an oligomer having different telechelic groups by adding a bifunctional reactant that combines the oligomers into a multi-block $(AB)_n$ type copolymer. One example of this approach is in the preparation of polycarbonate-polydimethylsiloxane block copolymers in which an alpha,omega-dichloro functional polydimethylsiloxane is reacted with bisphenol A, i.e., $(CH_3)_2C(C_6H_4OH)_2$. The product is a reactive oligomer which is then reacted with phosgene $COCl_2$ and additional amounts of bisphenol A. While telechelic functionality of this type on a siloxane chain is available commercially, difficulty controlling the molar ratio of such functional groups is severe.

C. Macro-Initiation by Selective Degradation

In this approach, a macroinitiator capable of initiating radical polymerization is obtained by including in the main siloxane chain a functional group that breaks down under certain conditions to form free radicals, for example $-CH_2-N=N-CH_2-$. Such free radicals at the end of broken chains can initiate polymerization of vinyl monomers, and can yield AB type block copolymers under some conditions. While this mode eliminates many of the problems associated with control of the molecular weight of copolymers due to mismatches of molar ratios of functional groups, the functional group that generates the free radical is typically located randomly along the polysiloxane chain. Statistically, therefore, there will be present polysiloxane chains that do not contain the functional group, and other polysiloxane chains that have different numbers of the functional group along the polymer chain. This randomness along the chain makes it difficult to control the block length of the siloxane chain, and inherently adds a wide distribution of block sizes to the final copolymer product. An even greater disadvantage of this approach is the fact that the organic blocks will not initiate from siloxane chains that do not include the functional group, which leaves some homopolysiloxane chains without organic blocks. This type of heterogeneity in the chain results in severe phase separation, and resultant instability of the final polymer product.

D. Macro-Initiation by Non-Selective Degradation

According to this approach, block copolymers can be obtained by subjecting polysiloxanes to (i) high shear using an extruder or high shear mixer, or (ii) high energy radiation such as plasma or electron beams, whereupon free radicals are obtained randomly along the polymer chain as a result of degradation under these conditions. The free radicals can then be used to initiate grafting of vinyl monomers and copolymerization. Although this approach is simpler than previously mentioned approaches, it too suffers from disadvantages in that one is not able to control the block size because the degradation event is random.

E. Grafting through an Active Silane

In this approach, rather than initiating free radical polymerization in a degradation site as in C and D above, active silanes can be included during polymerization or processing of organic polymers. The active silane is used to initiate siloxane polymerization, and leads to graft copolymers. The active silane can also be used in specific reactions such as hydrosilylation with the resulting coupling of a siloxane chain. One example of this approach is the use of vinyltrimethoxysilane $H_2C=CH-Si-(OCH_3)_3$ during processing of organic polymers. Although most commercial applications of this approach are directed toward crosslinking through the silicone units, it can be used to attach polysiloxane chains. However, the inclusion of an active silane in an organic polymer is still a random event, and this randomness prevents any control of molecular weight of organic blocks between the siloxane chains, leaving organic polymer chains which do not participate in the grafting reaction because of lack of an active silicone unit in the chain.

In view of the above, it would be desirable, and it is the purpose of our invention, to provide a process allowing for better and improved control of the molecular weight of individual blocks of a copolymer, as well as better and improved control of the molecular weight of the resulting copolymer itself.

BRIEF SUMMARY OF THE INVENTION

Our invention relates to a polymerization method in which polymerization or copolymerization of a polymerizable organic monomer is initiated in the presence of a Redox initiating system. The Redox initiating system includes as a first essential component:

(i) an organosilane or organopolysiloxane containing carbonyl functionality represented by one of the formulas:

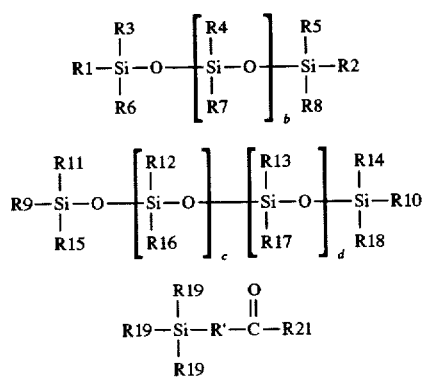

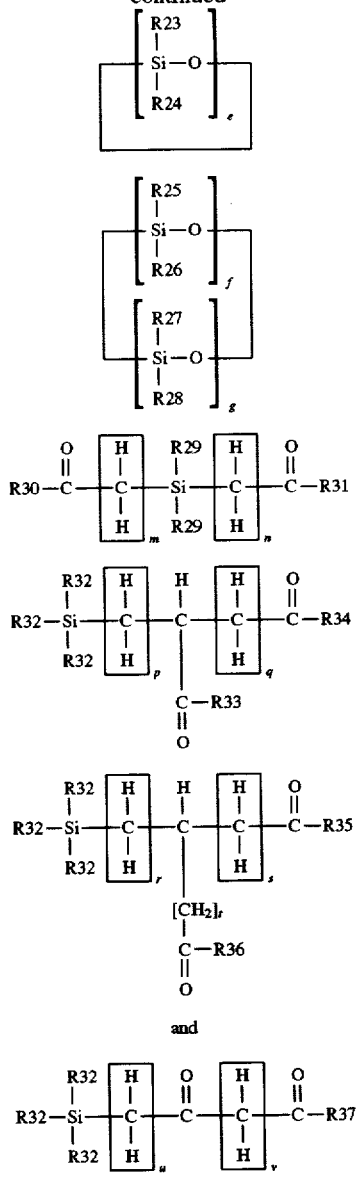

In these formulas, R1–R18 and R23–28 represent alkyl groups containing 1–6 carbon atoms, aryl groups, substituents containing an aldehyde radical separated by at least two carbon atoms from the silicon atom, or substituents containing a ketone radical separated by at least two carbon atoms from the silicon atom.

Integers represented by b have a value of 4–200; c has a value of 1–200, d has a value of about 1–10; e, f, and g, each have a value of 3–6; m and n each have a value of 2–4; p is 1–4; q is 2–6; r is 0–4; s and t each have a value of 1–8; u is 2–4; and v is 3–7.

R' represents a hydrocarbon linking group containing at least two carbon atoms.

R21, R30, R31, R33, and R34–R37 represent hydrogen, an alkyl radical, or an aryl radical.

R19, R29, and R32 represent an alkyl group, an aryl group, halogen, alkoxy, or acetoxy.

The first proviso is that at least one R1–R18 group and R23–R28 group in each formula be a substituent containing an aldehyde radical separated by at least two carbon atoms from the silicon atom, or that they be a substituent containing a ketone radical separated by at least two carbon atoms from the silicon atom.

The second proviso is that at least one R19, R29, and R32 group in each formula be halogen, alkoxy, or acetoxy.

A second essential component of the Redox initiating system is (ii) a soluble organic salt of CuII or mixture of soluble organic salts of $Cu''$ and $Cu'$.

One or more optional components can also be included, such as coordinating agents, among which are:

(iii) a tertiary amine or strong base;
(iv) a stabilizing ligand for $Cu''$ ions; and
(v) a stabilizing ligand for $Cu'$ ions.

Our invention also relates to polymers and copolymers prepared according to this method.

These and other features and objects of our invention will become apparent from a consideration of the detailed description.

DETAILED DESCRIPTION OF THE INVENTION

According to out invention, better and improved control of the molecular weight of individual blocks of a copolymer, as well as better and improved control of the molecular weight of the resulting copolymer itself, can be obtained.

This is achieved by initiating free radical polymerization from selective sites attached to a siloxane backbone. For example, telechelic hexenyl-functional siloxane polymers of various molecular weight are readily available commercially, and are most preferred as starting materials. Since the average molecular weight of a siloxane chain is inversely proportional to the concentration of material used to terminate chain ends of the siloxane (i.e. 5-hexenyldimethylchlorosilane), siloxane blocks of various length can be obtained by simply changing its concentration.

The most suitable initiator is a Redox initiating system based on (i) an organosilicon bound aldehyde or ketone; (ii) a soluble organic salt of $Cu''$, or mixture of soluble organic salts of $Cu''$ and $Cu'$, such as nitrates, sulfates, perchlorates, carboxylates, acetates, or acetylacetonates, i.e., copper$''$ 2-ethyl hexanoate and Cu octanoate in the case of soluble organic salts of $Cu''$, and complexes of $Cu'$ salts with two or three triphenylphosphines in the case of soluble organic salts of $Cu'$; and optionally one or more coordinating agents such as (iii) a tertiary amine or other type of strong base such as triethylamine and dimethylphenylamine; (iv) a stabilizing ligand for $Cu''$ ions such as pyridine; and (v) a stabilizing ligand for $Cu'$ ions such as triphenylphosphine.

Components (ii)–(v) of this particular Redox initiating system are described in detail in U.S. Pat. No. 5,405,913 (Apr. 11, 1995) which is incorporated herein by reference.

This Redox initiating system, in the presence of a vinyl monomer, leads to the formation of a free radical on a bound carbonyl (i.e., aldehyde or ketone), which in turn initiates polymerization of the organic monomer to desired block copolymers. It can be used to prepare organic polymers having ketone (or aldehyde) telechelic functional groups.

The Redox initiating system is based on the ability of soluble organic salts of $Cu''$ to oxidize enolate forms of an aldehyde, and generate α-carbonyl free radicals capable of initiating vinyl polymerization. The rate of initiation can be manipulated by the solvent medium, temperature, concentration of bound aldehyde, and type of bound aldehyde, which are employed. Other factors that can affect initiation include the particulars of the coordinating agents which are used.

One benefit according to our invention is the fact that this type of Redox initiating system ensures that organic polymer blocks are initiated only from siloxane chains, with the result that substantially no homopolymeric products are obtained. Other benefits are that the process is not water sensitive like ionic initiation processes, and the process enables one to use various commercially available organosilicon bound aldehydes and ketones, which provides for greater control of molecular weight and architecture of the resulting block copolymers, as well as control of the molecular weight of individual blocks.

The Redox initiating system can be used for initiating free radical polymerization according to bulk, suspension, or emulsion polymerization techniques. In addition, it allows free radical initiation in solution. This versatility enables one to prepare silicone block copolymers with vinyl organic monomers that are not miscible in the solution containing the silicone.

Our invention eliminates many of the problems described in Background sections A–E. Because it is based on an approach using hexenyl-containing organopolysiloxanes and organosilanes for dual polymerizations, i.e., free radical and polycondensation, it enables efficient conversion of hexenyl radicals to aldehydes and ketones, which are then used to initiate radical polymerization with the Redox initiating system described above.

Thus, silicone-containing block copolymers can be made herein by initiating the free radical polymerization of vinyl containing monomers from aldehyde or ketone groups attached to a siloxane polymer chain or to a polymerizable silane. In the case of the polymerizable silane, the order of polymerization (i.e., free radical or polycondensation) is not critical. That is, the polycondensation of the silane containing aldehyde or ketone functionality can be carried out initially, followed by the free radical polymerization of the vinyl monomer. Alternatively, the free radical initiation of the vinyl monomer from the aldehyde or ketone attached to the silane can be carried out initially, followed by siloxane polycondensation with a cyclosiloxane or a silanol terminated linear oligomeric siloxane.

Various polymer and copolymer architectures can be obtained depending upon the structure of the starting polysiloxane or silane. A simplified representation is given below, where the symbol ⁓⁓⁓ indicates an organic polymer block, the symbol — indicates a linear silicone or siloxane block, and the ○ indicates a cyclic siloxane polymer block.

| | |
|---|---|
| ⁓ | Organic Polymer Block |
| — | Silicone/Siloxane Polymer Block |
| ○ | Cyclic Siloxane Polymer Block |
| ⁓—⁓ | AB Type Block Copolymer |
| ⁓—⁓—⁓ | ABA Type Block Copolymer |
|  | Polymer Brush/Comb-Like Block Copolymer |

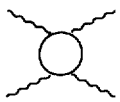
Radiant Organic Block Copolymer

Thus, for purposes of illustration, one scheme for preparing an AB Block Copolymer from an Aldehyde Silane, i.e., (5-pentanal) dimethylmethoxysilane, is illustrated below:

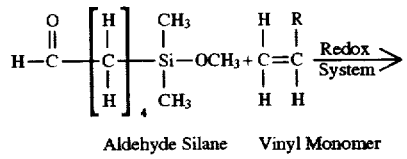

Aldehyde Silane    Vinyl Monomer

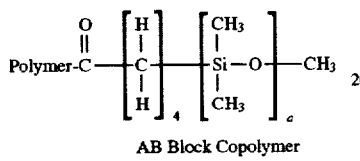

AB Block Copolymer

Another scheme for preparing an ABA Block Copolymer from a Telechelic Aldehyde Siloxane is illustrated below:

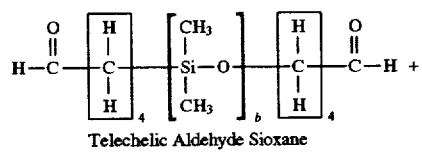

Telechelic Aldehyde Sioxane

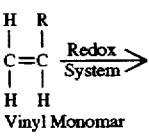

Vinyl Monomar

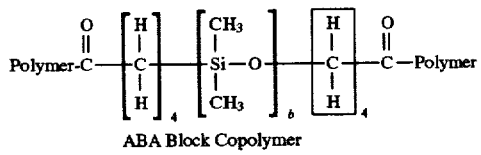

ABA Block Copolymer

The Telechelic Aldehyde Siloxane can be obtained by ozonolysis of polydiorganosiloxanes containing alkenyl groups, followed by treatment with a reducing agent such as zinc and acetic acid.

Depending upon the starting material selected for use, i.e., the polydiorganosiloxane containing alkenyl groups, a wide range of aldehyde and ketone functionalities can be obtained. Representative of some of the most preferred starting materials for ozonolysis and subsequent reduction according to our invention are shown below:

I. Telechelic Polymers corresponding to the formula

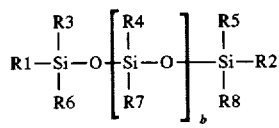

where R1 and R2 are hexenyl; R3 to R8 are methyl, and b is 30, 100, or 200.

An additional scheme for preparing Polymer Brush/Comb-Like Copolymers from a Telechelic & Pendant Aldehyde Siloxane is illustrated below:

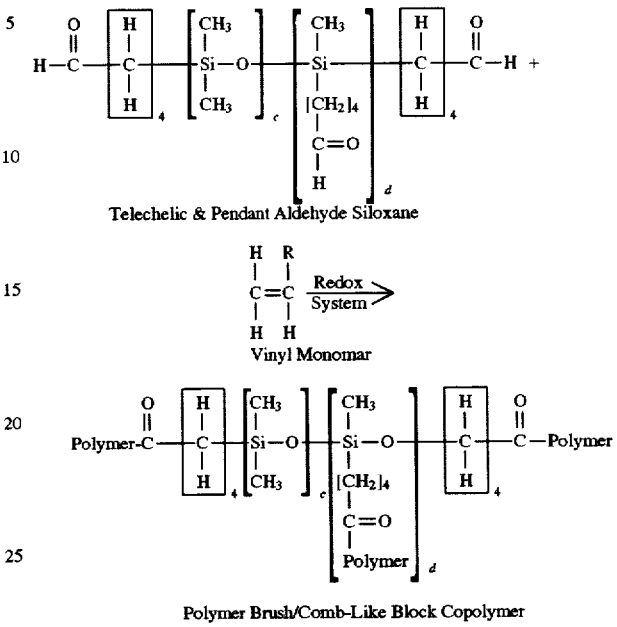

Telechelic & Pendant Aldehyde Siloxane

C=C Redox System

Vinyl Monomar

Polymer Brush/Comb-Like Block Copolymer

The Telechelic & Pendant Aldehyde Siloxane can also be obtained by ozonolysis of polydiorganosiloxanes containing alkenyl groups, followed by treatment with a reducing agent such as zinc and acetic acid.

Again, depending upon the starting material selected for use, i.e., the polydiorganosiloxane containing alkenyl groups, a wide range of aldehyde and ketone functionalities can be obtained. Representative of some of the most preferred starting materials for ozonolysis and subsequent reduction according to our invention are shown below.

II. Telechelic & Pendant Copolymers corresponding to the formula

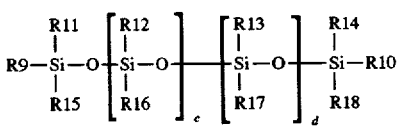

where R9, R10, and R17 are hexenyl; R11 to R16, and R18 are methyl; c is 70, 100, or 150; and the value of d is sufficient to provide 4, 2, and 5 mole percent, respectively of this methylhexenylsiloxy unit.

Generally, however, in these formulas, R1–R18 can represent an alkyl group containing 1–6 carbon atoms such as methyl, ethyl, propyl, butyl, pentyl, and hexyl, for example; an aryl group such as phenyl; or an alkenyl group with the unsaturated carbon atoms separated from the silicon atom by at least two saturated carbon atoms. Typically, b has a value of 4–200; c has a value of 1–200, and d has a value of about 1–10. Preferably, b and c have values of 30–150, most preferably 70–100.

As used herein, the term "telechelic" is intended to mean a polymer or copolymer that contains end groups that react selectively to give a bond with another molecule. Suitable alkenyl functional siloxanes and methods for their preparation are described, for example, in U.S. Pat. No. 4,609,574 (Sep. 2, 1986), assigned to the same assignee as the present invention, which is incorporated herein by reference.

In general, these materials can be described as being made up of diorganosiloxane "D" units $R_2^aSiO_{2/2}$ and chain terminating "M" units $R_3^aSiO_{1/2}$ where $R^a$ is a methyl radical or a hydrocarbon radical containing unsaturation. The unsaturated radicals (represented above by R1–R18, for example) include higher alkenyl radicals such as —(CH$_2$)$_m$—CH=CH(CH$_2$)$_n$H, where m has a value of 2, 3, or 4; and n has a value of 0, 1, or 2; although m can exceed 4, and n can exceed 2, if desired. The unsaturation need not be in the terminal position of the hydrocarbon. However, it must be at least two carbon atoms removed from the silicon atom.

Aldehyde Silanes are also obtained by ozonolysis of organosilanes containing alkenyl groups, followed by treatment with a reducing agent such as zinc and acetic acid, in a similar fashion as Aldehyde Siloxanes.

Representative of some of the most preferred starting materials, i.e. organosilanes containing an alkenyl group, according to our invention are shown below:

III. Organosilanes corresponding to the formula

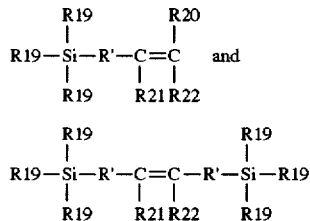

where R' is a hydrocarbon linking group containing at least two carbon atoms; R20, R21, and R22, are hydrogen, an alkyl radical, or an aryl radical; and R19 is an alkyl group, an aryl group, halogen, alkoxy, or acetoxy; provided at least one R19 group is halogen, alkoxy, or acetoxy.

Some examples of silanes in which the unsaturation is at least two carbon atoms removed from the silicon atom are compounds such as 3-butenylmethyldichlorosilane, 5-hexenyldimethylchlorosilane, 5-hexenylmethyldichlorosilane, 5-hexenyltrichlorosilane, 7-octenyldimethylchlorosilane, 7-octenyltrichlorosilane, 1,10-bis(dimethylchlorosilyl)-5-decene, 3-butenyltriethoxysilane, 5-hexenyldimethylmethoxysilane, 5-hexenylmethyldimethoxysilane, and 7-octenyltrimethoxysilane.

When Organosilanes containing unsaturation are subjected to ozonolysis and reduction, the yield is an Aldehyde Silane corresponding to

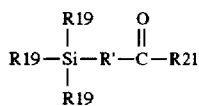

when R21 represents hydrogen, and R' and R19 have the same meanings as previously described. When R21 is an alkyl or aryl group, a Ketone Silane is obtained.

It is also possible to use cyclic organosiloxanes containing carbonyl functionality having a structure corresponding to the formula

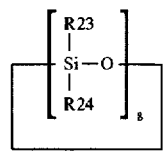

and the formula

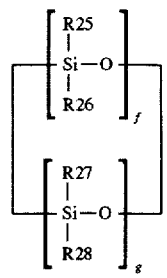

wherein R23–R28 represent an alkyl group containing 1–6 carbon atoms such as methyl, ethyl, propyl, butyl, pentyl, and hexyl, for example; an aryl group such as phenyl; a substituent containing an aldehyde radical separated by at least two carbon atoms from the silicon atom; or a substituent containing a ketone radical separated by at least two carbon atoms from the silicon atom. Generally, e, f, and g, have values of 3, 4, 5, and 6, or more. At least one R23–R28 in each formula should be a substituent containing an aldehyde radical separated by at least two carbon atoms from the silicon atom, or a substituent containing a ketone radical separated by at least two carbon atoms from the silicon atom.

Yet another scheme for preparing Radiant/Star Organic Block Copolymers from such Cyclic Aldehyde Siloxanes is illustrated below. For the sake of simplicity, the alkyl group on each silicon atom have not been depicted.

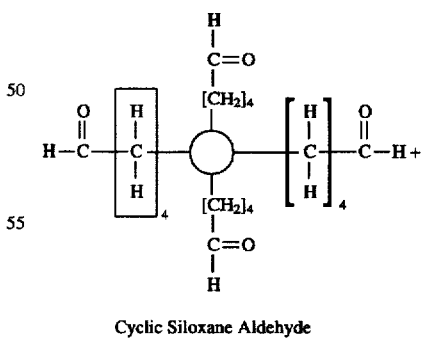

Cyclic Siloxane Aldehyde

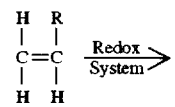

Vinyl Monomer

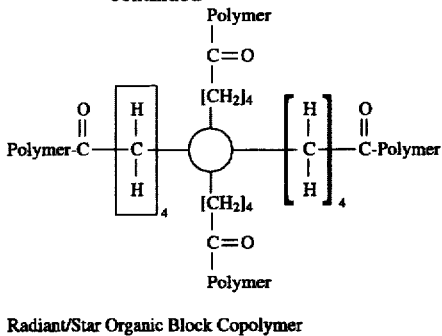

Radiant/Star Organic Block Copolymer

Cyclic organosiloxanes containing carbonyl functionality are prepared as previously noted, i.e., the conversion of a polydiorganosiloxane containing an alkenyl group such as $[H_2C=CH(CH_2)_4(CH_3)SiO]_4$ to a polydiorganosiloxane containing a carbonyl group by treatment with ozone, followed by treatment with a reducing agent.

In addition, it is possible to use silanes prepared by the ozonolysis and reduction of cycloalkenyl silanes in which the silicon atom constitutes part of a ring structure, and ozonolysis and reduction of cycloalkenyl silanes in which the silicon atom does not constitute part of a ring structure. Organosilanes containing carbonyl functionality of these two types can be represented by the following formulas:

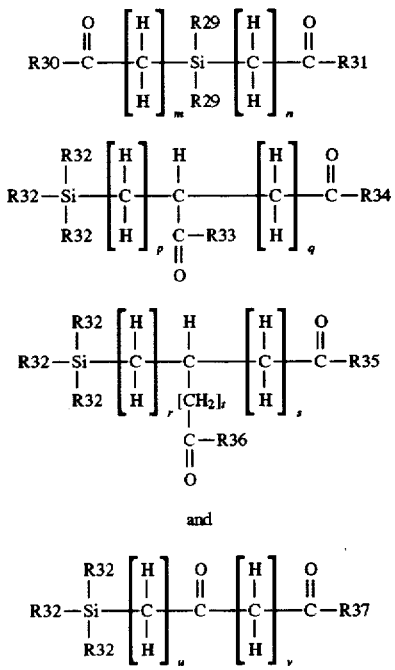

where R29 and R32 in each formula represent an alkyl group, an aryl group, halogen, alkoxy, or acetoxy, provided at least one R29 and R32 group in each formula is halogen, alkoxy, or acetoxy; R30, R31, R33, and R34–R37 in each formula represent hydrogen, an alkyl radical, or an aryl radical; m and n each have a value of 2–4; p is 1–4; q is 2–6; r is 0–4; s and t each have a value of 1–8; u is 2–4; and v is 3–7.

Cycloalkenyl silanes in which the silicon atom constitutes part of a ring structure are described, for example, in the *Journal of Organic Chemistry*, Volume 39 (11), Pages 1539–1542, (1974). Some examples of cycloalkenyl silanes in which the silicon atom does not constitute part of a ring structure are |2-(3-cyclohexenyl)ethyl| dimethylchlorosilane, |2-(3-cyclohexenyl)ethyl| methyldichlorosilane, 3-cyclohexenyltrichlorosilane, |2-(3-cyclohexenyl)ethyl|triethoxysilane, and |2-(3-cyclohexenyl)ethyl|trimethoxysilane.

Representative polymerizable organic monomers which can be initiated, and polymerized or copolymerized, according to our invention are styrene; chloroprene; hydroxyethyl acrylate; hydroxyethyl methacrylate; acrylonitrile; methacrylonitrile; acrylamide; methacrylamide; acrylate esters such as ethyl acrylate and t-butyl acrylate; methacrylate esters such as methyl methacrylate and t-butyl methacrylate; vinyl halides such as vinyl chloride; vinyl esters such as vinyl acetate; butadiene; and isoprene.

One unique feature of our invention resides in the fact that the organosilicon monomer (i.e., the cyclosiloxane or silanol terminated linear oligomeric siloxane) or the polysiloxane, can function as solvent or a suspending medium in the free radical initiation of the vinyl monomer. When an organosilicon monomer is used as solvent, it is subsequently polymerized to form the siloxane block. In either case, use of organic solvents such as methylene chloride, carbon tetrachloride, or chloroform, is eliminated, with the benefit that there is no need to precipitate the polymer and dispose of or recycle a solvent.

Some additional benefits of our invention are that (A) essentially all starting materials are readily available commercially; (B) the block copolymer products are essentially free of homopolymeric species; (C) a great degree of control of the structure, i.e., the architecture, of the block copolymer is made possible; and (D) the synthetic route is relatively simple, it is not water sensitive, and it does not require specialized process equipment or stringent experimental conditions.

The reaction temperature used for carrying out the method of our invention can range from –100°C. to 200° C., but typically a temperature of about 70° C. is adequate. The reaction time can vary from a few minutes to several hours and even days, but typically the reaction can be carried out to completion within about 1–2 hours. While an oxygen-free atmosphere is preferred for carrying out the reaction, it is not essential.

The amount of $Cu^{II}$ salt that is used can range from an amount as low as $10^{-6}$M to an amount as high as 0.1M. The amount of the organosilane containing carbonyl functionality, and the amount of the organosiloxane containing carbonyl functionality, that are used can also range from an amount as low as $10^{-6}$M to an amount as high as 5.0M. The amount of polymerizable organic monomer(s) ranges from amounts as low as 0.1M to amounts as high as 10.0M or more.

The following examples are set forth for the purpose of illustrating our invention in more detail.

EXAMPLE 1

Silicone Terminated Polyethylacrylate AB Block Copolymer

Initiation of a polyethylacrylate from a silane containing an aldehyde group was conducted by reacting the silane aldehyde (5-pentanal) dimethylchlorosilane (15.22 grams) with ethyl acrylate monomer (5.05 grams), in the presence of $copper^{II}$ 2-ethyl hexanoate (0.10 grams), pyridine (0.52 grams), triethylamine (0.12 grams), and triphenylphosphine (0.30 grams). The silane aldehyde (5-pentanal) dimethylchlorosilane was obtained by ozonolysis of the alkenyl group containing silane 5-hexenyldimethylchlorosilane, followed by reducing the resulting ozonide bound silane intermediate to the silane aldehyde. The silane aldehyde was carried in methylene chloride as solvent. Prior to polymerization, any inhibitor present was removed from the ethyl acrylate monomer by passing it through an alumina column, and then purging the reaction mixture with nitrogen for 5 minutes. Polymerization was initiated by placing a vessel containing the reaction mixture in a water bath set at 70° C. After about 5 minutes, an intense green color due to the presence of $Cu''$ began to fade, and within one hour it completely disappeared, indicating conversion to $Cu'$ and free radical initiation. The polymer was precipitated from methanol.

EXAMPLE 2

PDMS/Polystyrene ABA Block Copolymer

A block copolymer represented by PS-PDMS-PS where PS is polystyrene and PDMS is polydimethylsiloxane, was prepared by reacting a telechelic aldehyde PDMS having an average degree of polymerization of 100 siloxane units (10.62 grams) with styrene (7.80 grams), in the presence of $copper''$ 2-ethyl hexanoate (0.15 grams), pyridine (0.77 grams), triethylamine (0.16 grams), and triphenylphosphine (0.53 grams). The telechelic aldehyde PDMS was obtained by ozonolysis and subsequent reduction of Telechelic Polymer shown above, where R1 and R2 were hexenyl, R3–R8 were methyl, and b had a value of 100. The telechelic aldehyde PDMS was carried in methylene chloride as solvent. Prior to polymerization, any inhibitor present was removed from styrene by passing it through an alumina column, and then purging the reaction mixture with nitrogen for 5 minutes. Polymerization was initiated by placing a vessel containing the reaction mixture in a water bath set at 70° C. Within a few minutes, the green color characteristic of $copper''$ began to fade, and eventually disappeared, leaving the reaction mixture transparent and colorless. After one hour of reaction time, the polymer was recovered by pouring the reaction mixture into methanol to precipitate the copolymer.

Unless otherwise indicated, the remaining examples follow the same general procedure used in Example 2. In addition, reference should be had to Table I, which shows the amount of each of the various ingredients used in each of the remaining examples.

EXAMPLE 3

PDMS/Polystyrene ABA Block Copolymer

Another block copolymer represented by PS-PDMS-PS having a shorter PDMS polymer segment was prepared by the same procedure used in Example 2, except that the telechelic aldehyde PDMS was obtained by ozonolysis and subsequent reduction of Telechelic Polymer shown above, where R1 and R2 were hexenyl, R3–R8 were methyl, and b had a value of 30 instead of 100.

EXAMPLE 4

Comparative Example

No polymerization of styrene monomer was obtained when Example 2 was repeated in the absence of the aldehyde bound siloxane. The green color of the reaction mixture remained unchanged throughout the experiment, and no polymer was precipitated when the mixture was poured into methanol. This example demonstrates that initiation occurs from the silicone segment, and indicates that if polymerization of a vinyl monomer does occur, it leads to block copolymerization.

EXAMPLE 5

PDMS/Polyethylacrylate ABA Block Copolymer

A block copolymer represented by PEtA-PDMS-PEtA where PEtA is polyethylacrylate was prepared by the same procedure used in Example 2. Ethyl acrylate was used as the monomer, and it was treated with alumina in the same way styrene was treated to remove any polymerization inhibitor which was present. This example demonstrates that initiation is not monomer dependent, but that in general, it is suitable for any vinyl monomer capable of undergoing free radical polymerization.

EXAMPLE 6

PDMS/Polyethylacrylate ABA Block Copolymer

A block copolymer represented by PEtA-PDMS-PEtA was obtained from ethyl acrylate, and the telechelic aldehyde PDMS obtained by ozonolysis and subsequent reduction of Telechelic Polymer shown above, where R1 and R2 were hexenyl, R3–R8 were methyl, and b had a value of 100. The procedure in Example 5 was repeated, but with a different ratio of silicone and organic segments, as can be seen by reference to Table I. This example indicates that molecular weights of individual segments in block copolymers can be controlled.

EXAMPLE 7

Comparative Example

No polymerization of ethyl acrylate monomer was obtained when Example 5 was repeated in the absence of the aldehyde bound siloxane. As in Comparative Example 4, the green color of the reaction mixture remained unchanged throughout the experiment, and no polymer was precipitated when the mixture was poured into methanol. This example demonstrates that initiation occurs from the silicone segment, and indicates that when polymerization of vinyl monomers occurs, it leads to block copolymerization.

EXAMPLE 8

PDMS/Polvethylacrylate ABA Block Copolymer

A block copolymer represented by PEtA-PDMS-PEtA having a shorter PDMS polymer segment was prepared by following the procedure in Example 5, except that the solvent methylene chloride was omitted. In addition, the telechelic aldehyde PDMS was obtained by ozonolysis and subsequent reduction of Telechelic Polymer shown above, where R1 and R2 were hexenyl, R3–R8 were methyl, and b had a value of 30. This example demonstrates that no organic solvent such as methylene chloride, carbon tetrachloride, or chloroform, is required to control free radical polymerization, and that the silicone segment itself is sufficient to control and prevent disruption of polymerization kinetics. The liquid silicone polymer acts as the solvent and eliminates the formation of gels.

EXAMPLE 9

PDMS/Polyhydroxyethylacrylate ABA Block Copolymer

A block copolymer represented by PHEtA-PDMS-PHEtA where PHEtA is polyhydroxyethylacrylate was prepared by the same procedure described in Example 2. The hydroxyethyl acrylate monomer was treated with alumina in the same way styrene was treated in Example 2 to remove any polymerization inhibitor which may have been present. This example demonstrates that initiation is not monomer dependent, but that in general, it is suitable for any vinyl monomer capable of undergoing free radical polymerization.

EXAMPLE 10

PDMS/Polyhydroxyethylacrylate ABA Block Copolymer

A block copolymer represented by PHEtA-PDMS-PHEtA was obtained from hydroxyethyl acrylate, and the telechelic aldehyde PDMS obtained by ozonolysis and subsequent reduction of Telechelic Polymer shown above, where R1 and R2 were hexenyl, R3–R8 were methyl, and b had a value of 100. The procedure in Example 9 was followed, but with a different ratio of the silicone and organic segments, as can be seen by reference to Table I. This example indicates that molecular weights of individual segments in block copolymers can be controlled.

EXAMPLE 11

PDMS/Polyacrylamide ABA Block Copolymer

A block copolymer represented by PAA-PDMS-PAA where PAA is polyacrylamide, was prepared by the same procedure described in Example 2. The acrylamide monomer was treated with alumina in the same way styrene was treated, to remove the presence of any polymerization inhibitor. This example demonstrates that initiation is not monomer dependent, but that it is suitable for any vinyl monomer capable of undergoing free radical polymerization.

EXAMPLE 12

PDMS/Polyacrylamide ABA Block Copolymer

A block copolymer represented by PAA-PDMS-PAA was obtained from acrylamide, and the telechelic aldehyde PDMS obtained by ozonolysis and subsequent reduction of Telechelic Polymer shown above, where R1 and R2 were hexenyl, R3–R8 were methyl, and b had a value of 100. The procedure described in Example 11 was followed, except that two (2) different ratios of silicone (15.55/15.22) to organic segment (3.12/1.08) were employed, as can be seen by reference to Table I. This example indicates that molecular weights of individual segments in block copolymers can be controlled.

EXAMPLE 13

Comparative Example

No polymerization of acrylamide monomer was observed when Example 11 was repeated in the absence of aldehyde bound siloxane. As was the case in Comparative Examples 4 and 7, the green color of the reaction mixture remained unchanged throughout the experiment, and no polymer precipitated when the mixture was poured into methanol. This example demonstrates that initiation occurs from the silicone segment, indicating that when polymerization of vinyl monomers occurs, it leads to block copolymerization.

EXAMPLE 14

PDMS/Polystyrene Polymer Brush/Comb-Like Block Copolymers

This example demonstrates the preparation of a different type of copolymer architecture, where organic segments are distributed along silicone chain segments in a brush or comb-like arrangement. This structure was obtained by initiating free radical polymerization of styrene from a silicone polymer having telechelic and pendant aldehyde groups. The styrene polymerization was initiated by the procedure described in Example 2, and the polymer was precipitated in methanol. Two (2) telechelic and pendant aldehyde PDMS were used in this example, and both were obtained by ozonolysis and subsequent reduction of Telechelic & Pendant Copolymers shown above, where R9, R10, and R17 were hexenyl; R11–R16 and R18 were methyl; c had values of 70 and 150; and d had values sufficient to provide, respectively, 4 and 5 mole percent of the methylhexenylsiloxy d unit. The copolymer with 70 c units was used in the first run shown in Table I, and the copolymer with 150 c units was used in the second and third runs shown in Table I.

EXAMPLE 15

PDMS/Polystyrene Polymer Brush/Comb-Like Block Copolymers

Example 14 was repeated except that a telechelic and pendant aldehyde PDMS was used in this example, and it was obtained by ozonolysis and subsequent reduction of Telechelic & Pendant Copolymer shown above, where R9, R10, and R17 were hexenyl; R11–R16 and R18 were methyl; c had a value of 70; and d had a value sufficient to provide 6 mole percent of methylhexenylsiloxy d unit. Free radical polymerization of styrene was initiated, yielding a central silicone chain to which six polystyrene chains were attached. This example demonstrates that the density of pendant organic segments can be controlled and manipulated by the concentration of pendant aldehyde (hexenyl) functionality on the silicone segment. Overall control, however, can be exercised via manipulation of the ratio of dimethylsiloxane to methylhexenyl siloxane used in condensation processes for preparing silicone polymers.

EXAMPLE 16

Polyethylacrylate/Cyclosiloxane Radiant Organic Block Copolymer

A block copolymer represented by $(PE)_4$-cyclosiloxane where PE is polyethylacrylate, was prepared by reacting a cyclosiloxane aldehyde containing four silicon atoms in the ring (14.5 grams), with ethyl acrylate (11.2 grams), in the presence of copper[II] 2-ethyl hexanoate (0.12 grams), pyridine (0.52 grams), triethylamine (0.12 grams), and triphenylphosphine (0.32 grams). The cyclosiloxane aldehyde was obtained by ozonolysis of hexenyl functional cyclosiloxane $[(CH_2=CH-(CH_2)_4(CH_3)SiO]_4$. Prior to polymerization, any inhibitor present was removed from ethyl acrylate by passing it through an alumina column, and then purging the reaction mixture with nitrogen for 5 minutes. Polymerization was initiated by placing a vessel containing the reaction mixture in a water bath set at 70° C. Within a few minutes, the green color characteristic of copper[II] began to fade, and eventually disappeared, leaving the reaction mixture transparent and colorless. After one hour of reaction time, the polymer was recovered by pouring the reaction mixture into methanol to precipitate the radiant or star copolymer.

A compilation of the foregoing examples is set forth below in Table I, in which the amount of the various components used in the several examples is shown expressed in grams. In Table I, TEA represents triethylamine, TPPHOS represents triphenylphosphine, and Si Component represents the organosilane or the organosiloxane containing carbonyl functionality that was employed in that example.

TABLE I

| Ex. | Si Component | $Cu^{II}$ | Pyridine | TEA | TPPHOS | Monomer |
|-----|--------------|-----------|----------|------|--------|---------|
| 1   | 15.22        | 0.10      | 0.52     | 0.12 | 0.30   | 5.05    |
| 2   | 10.62        | 0.15      | 0.77     | 0.16 | 0.53   | 7.80    |
| 3   | 11.83        | 0.15      | 0.78     | 0.17 | 0.51   | 8.29    |
| 4   | —            | 0.10      | 0.51     | 0.12 | 0.30   | 5.05    |
| 5   | 10.04        | 0.10      | 0.53     | 0.11 | 0.30   | 3.08    |
| 6   | 19.29        | 0.11      | 0.50     | 0.11 | 0.30   | 1.06    |
| 7   | —            | 0.10      | 0.50     | 0.10 | 0.30   | 5.20    |
| 8   | 3.08         | 0.10      | 0.50     | 0.12 | 0.30   | 3.20    |
| 9   | 15.04        | 0.10      | 0.51     | 0.10 | 0.31   | 5.08    |
| 10  | 16.43        | 0.10      | 0.52     | 0.11 | 0.32   | 10.69   |
| 11  | 14.58        | 0.10      | 0.56     | 0.14 | 0.38   | 5.08    |
| 12  | 15.55        | 0.10      | 0.51     | 0.12 | 0.33   | 3.12    |
| 12  | 15.22        | 0.10      | 0.50     | 0.11 | 0.30   | 1.08    |
| 13  | —            | 0.10      | 0.51     | 0.12 | 0.30   | 4.55    |
| 14  | 10.57        | 0.16      | 0.88     | 0.19 | 0.51   | 7.79    |
| 14  | 10.43        | 0.16      | 0.79     | 0.19 | 0.54   | 8.11    |
| 14  | 10.10        | 0.15      | 0.78     | 0.18 | 0.50   | 9.09    |
| 15  | 2.17         | 0.10      | 0.51     | 0.11 | 0.30   | 5.07    |
| 16  | 14.5         | 0.12      | 0.52     | 0.12 | 0.32   | 11.2    |

Other variations may be made in compounds, compositions, and methods described herein without departing from the essential features of our invention. The forms of invention are exemplary only and not intended as limitations on its scope as defined in the appended claims.

We claim:

1. A polymerization method comprising initiating the polymerization or copolymerization of a polymerizable organic monomer in the presence of:

(i) an organosilane or organopolysiloxane containing carbonyl functionality selected from the group consisting of

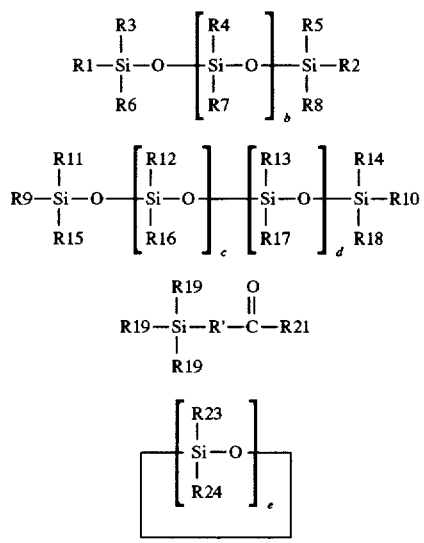

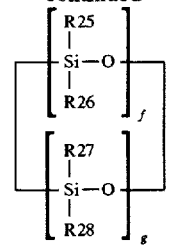

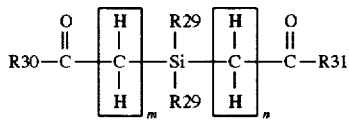

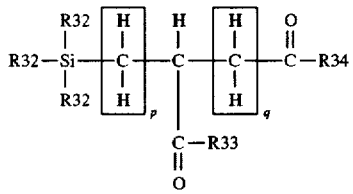

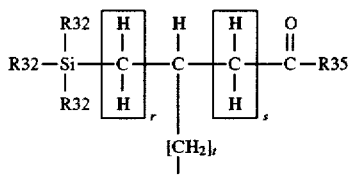

and

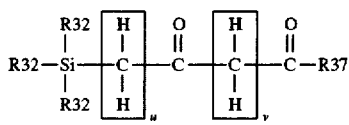

where R1–R18 and R23–28 in each formula represent an alkyl group containing 1–6 carbon atoms, an aryl group, a substituent containing an aldehyde radical separated by at least two carbon atoms from the silicon atom, or a substituent containing a ketone radical separated by at least two carbon atoms from the silicon atom;

b has a value of 4–200; c has a value of 1–200, d has a value of about 1–10; e, f, and g, each have a value of 3–6; m and n each have a value of 2–4; p is 1–4; q is 2–6; r is 0–4; s and t each have a value of 1–8; u is 2–4; v is 3–7;

R' is a hydrocarbon linking group containing at least two carbon atoms;

R19 represents an alkyl group, an aryl group, halogen, or acetoxy;

R21, R30, R31, R33, and R34–R37 in each formula represent hydrogen, an alkyl radical, or an aryl radical;

R29 and R32 in each formula represent an alkyl group, an aryl group, halogen, alkoxy, or acetoxy;

provided at least one R1–R18 group and R23–R28 group in each formula is a substituent containing an aldehyde radical separated by at least two carbon atoms from the silicon atom, or a substituent containing a ketone radical separated by at least two carbon atoms from the silicon atom; and provided at least one R19, R29, and R32 group in each formula is halogen, alkoxy, or acetoxy;

(ii) a soluble organic salt of $Cu''$ or mixture of soluble organic salts of $Cu''$ and $Cu'$, and optionally one or more coordinating agents selected from the group consisting of (iii) a tertiary amine or strong base;
(iv) a stabilizing ligand for $Cu''$ ions; and
(v) a stabilizing ligand for $Cu'$ ions.

2. A method according to claim 1 in which the Redox initiating system includes copper$''$ 2-ethyl hexanoate or $Cu''$ octanoate as the soluble organic salt of $Cu''$.

3. A method according to claim 1 in which the Redox initiating system includes triethylamine or dimethylphenylamine as the tertiary amine coordinating agent.

4. A method according to claim 1 in which the Redox initiating system includes pyridine as the stabilizing ligand for $Cu''$ ions.

5. A method according to claim 1 in which the Redox initiating system includes triphenylphosphine as the stabilizing ligand for $Cu'$ ions.

6. A method according to claim 1 in which the polymerizable organic monomer is a vinyl containing monomer.

7. A method according to claim 6 in which the polymerizable organic monomer is styrene, ethyl acrylate, acrylamide, or hydroxyethyl acrylate.

8. A method according to claim 1 in which initiation of the polymerization or copolymerization of the polymerizable organic monomer is carried out free of the presence of an organic solvent.

9. A method according to claim 1 in which initiation of the polymerization or copolymerization of the polymerizable organic monomer is carried out in the presence of the silane aldehyde (5-pentanal) dimethylchlorosilane, a telechelic aldehyde functional polydimethylsiloxane polymer, or a telechelic and pendant aldehyde functional polydimethylsiloxane copolymer.

10. Polymers and copolymers prepared according to the method defined in claim 1.

* * * * *